United States Patent Office 3,224,801
Patented Dec. 21, 1965

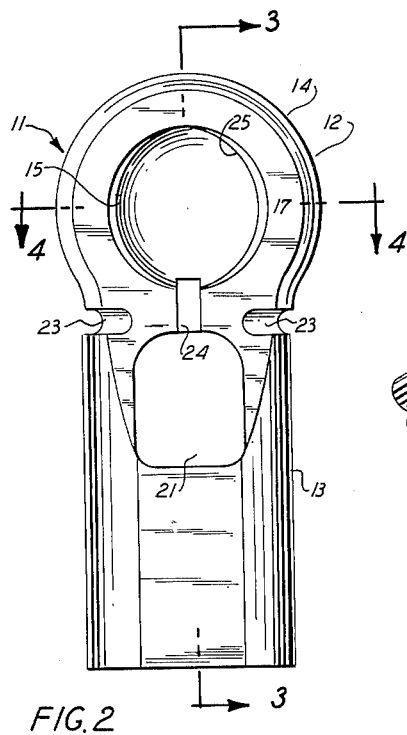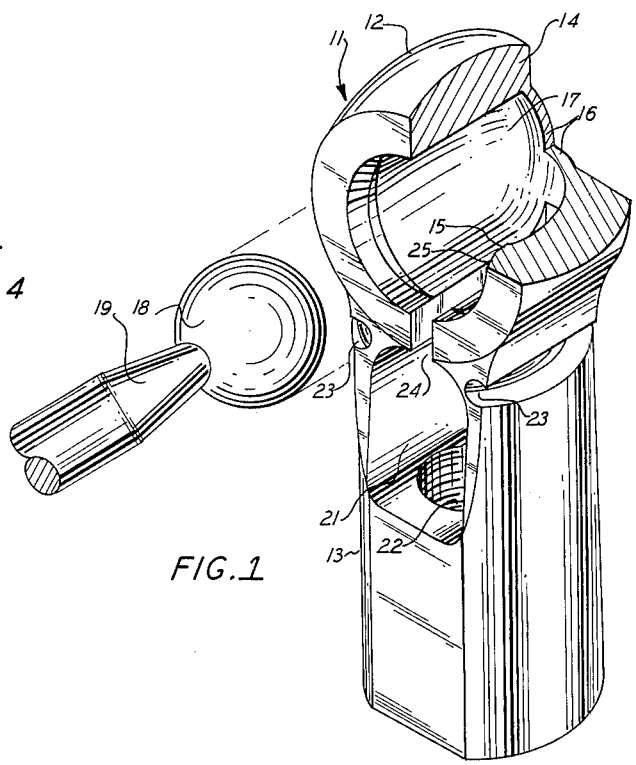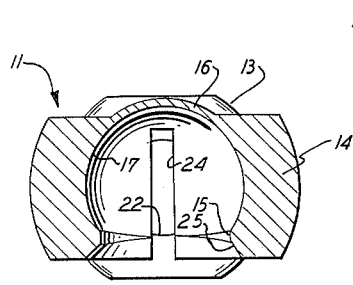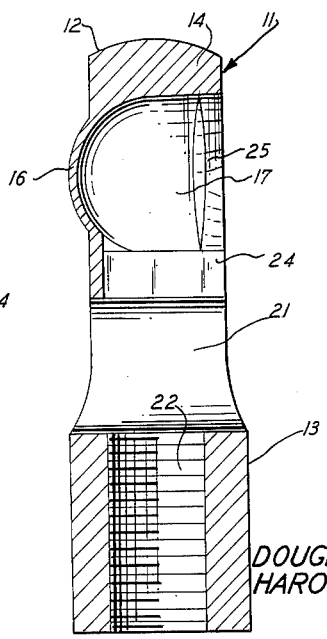
DOUGLAS PRICE-STEPHENS
HAROLD E. JACKSON
INVENTORS

3,224,801
CONNECTING MEANS
Douglas Price-Stephens, Brentwood, and Harold E. Jackson, Plympton St. Maurice, England; said Price-Stephens assignor to Ford Motor Company, Dearborn, Mich., a corporation of Delaware; said Jackson assignor, by mesne assignments, to Imperial-Eastman Corporation, Chicago, Ill., a corporation of Illinois
Filed Oct. 3, 1962, Ser. No. 228,082
Claims priority, application Great Britain, Oct. 27, 1961, 38,553/61
4 Claims. (Cl. 287—90)

This invention relates to a connecting means and more particularly to a socket for a snap together ball and socket joint.

It is current practice to utilize universally connected linkages in control rod assemblies such as, for example, an accelerator linkage for an automotive vehicle engine. Universal connecting joints are usually of a ball and socket construction with the ball at one end of a rodlike member received in the socket of a connecting element. Most ball and socket joints have a metal to metal contact between the coupled members which has the inherent disadvantage of high wear at the point of connection. Also, under operating conditions, the metal to metal contact is a source of noise which is readily transmitted by the coupled metallic members.

One way to overcome these deficiencies is to provide extensive lubrication for the socket. Also, the fabrication of the socket joint from a plastic material to eliminate or reduce lubrication has been tried but this has frequently resulted in a relatively loose connection that has a tendency to snap apart under severe usage. If a metal part is used in conjunction with a plastic socket member to provide additional retention means, special tools are required to assemble or disassemble the ball and the socket when the replacement or repair of one of the coupled members is necessary. Further, the ingress of dirt into a plastic socket cavity may result in extensive damage of its inner wall to bring about an early failure of the joint.

In view of the prior art, it is an object of the present invention to provide a simple and economical socket for a ball and socket joint which will not be a source of operating noise, does not require any lubrication, and provides a durable universal connection that is readily disconnected or connected without the requirement of special tools. Further, the socket of this invention is designed to minimize the entrance of dirt into the ball receiving portion of the socket.

To accomplish this, the socket of this invention is fabricated from a relatively resilient material. It has a ball receiving cavity for retaining a ball attached to a linkage member and the opening to the cavity is slightly smaller than the cross sectional area of the ball to be received in the socket. An axial slit extends through the wall of the cavity to aid in the resilient expansion of the opening when the ball is projected therethrough. The opening returns to its original free dimension when the ball is received in the cavity to prevent its withdrawal from the socket.

In a preferred embodiment of this invention, the socket for the ball and socket joint comprises a head and a shank integrally formed from a relatively resilient plastic material. The head has a ring portion with a first opening at one end and a semispherical-shaped web closing the other end. The thickness of the web is less than one half the thickness of the body of the ring portion. The web and internal wall of the ring portion define the ball receiving cavity. The shank is provided with a second opening and an axial slit which extends through the wall of the ring portion to connect the cavity with the second opening. As the first opening is smaller than the diameter of the ball, the ring portion and the web will resiliently deform when the ball is projected through the first opening. After the ball is received within the cavity, the ring portion and the web will return to their original free dimension to prevent the withdrawal of the ball from the socket.

As the web is substantially thinner in cross section than the body of the ring portion, the entire socket has an improved elasticity that will assist in the retention of the ball within the cavity and facilitate the snapping of the ball in or out of the socket without requiring the need for special tools.

Other advantages of this invention will become more apparent as this description proceeds, particularly when considered in connection with the accompanying drawings, wherein:

FIGURE 1 is an exploded view in perspective illustrating the socket of this invention about to receive a ball attached to the end of a rodlike member;

FIGURE 2 is a front view of the socket of this invention;

FIGURE 3 is a section taken along line 3—3 of FIGURE 2; and,

FIGURE 4 is a section taken along line 4—4 of FIGURE 2.

Referring now to the drawing, FIGURE 1 depicts a socket construction in accordance with this invention and generally designated by the reference numeral 11. The socket 11 is molded from a resilient plastic material such as nylon. It is provided with a head 12 at one end and a shank 13 at the other end.

The head 12 comprises a ring portion 14 having a first opening 15 at one end thereof. A semispherical web 16 closes the other end of the ring portion 14. The internal walls of the ring portion 14 and the web 16 define a spherically shaped cavity 17. It will be noted in FIGURES 1 and 3 that some portions of the cavity wall are straight while other portions (FIGURE 4) are curved to grasp a ball. As can be seen from FIGURE 2, the configuration of the first opening 15 approaches an ellipse shape. A ball 18 at the end of a rodlike member 19, which is to be universally coupled to the socket 11, is approximately of the same diameter as the internal diameter of the spherical cavity 17. The diameter of the ball 19 is also about equal to the lengthwise dimension of the elliptical opening 15 (FIGURE 3) but larger than the crosswise dimension (FIGURE 4).

A generally rectangular-shaped second opening 21 extends through the upper portion of the shank 13 as best seen in FIGURES 2 and 3. The lower portion of the shank 13 has an internally threaded hole 22 that extends from the end of the shank 13 along the center axis of the socket 11 into the second opening 21. The hole 22 is designed to receive the threaded end of a link (not shown) which forms a part of the connecting linkage. To improve the elasticity of the head 12, a peripheral groove 23 may be cut into the head 12 at the point of juncture of the ring portion 14 and the shank 13 as best seen in FIGURE 2.

An axial slit 24 is provided in the ring portion 14 to connect the cavity 17 with the second opening 21. This axial slit 24 extends inwardly with its inner end closed by the diaphragm or web 16. As can be best seen in FIGURE 4, the web 16 which is integrally formed with the ring portion 14, has a reduced section that is less than one half the thickness of the body of the ring portion 14 to provide the socket 11 with a high elasticity.

The minor axis of the first opening 15 is smaller in dimension than the diameter of the ball 18 so that the latter will have to be forced through the opening 15 to be admitted into the cavity 17. Beveled edge portions 25 of the first opening 15 assist in guiding the ball 18 into the opening 15 during assembly.

When the ball 18 at one end of the rodlike member 19 is forced into the cavity 17 through the first opening 15, the ring portion 14, the web 16, and the uppermost portion of the shank 13 will be resiliently deformed until the ball 18 is received within the cavity 17. Then the deformed portions will return to their original free dimension to retain the ball 18 in the cavity 17 to prevent the withdrawal of the rodlike member 19 from the socket 11. The minor axis of the first opening 15 should be of a dimension that will permit the socket 11 to resiliently deform to admit the ball 18 under hand pressure alone for ease of assembly.

The web 16 prevents the ingress of dust, grit, and other foreign matter into the cavity 17 and also has an elasticity greater than that of the main body of the ring portion 14 so that the introduction of the ball 18 is facilitated and its retention is improved.

It is to be understood that the form of the invention is not to be limited to the exact construction shown and described but that various changes and modifications may be made without departing from the spirit and scope of the invention as defined in the appended claims.

We claim:

1. A socket member adapted to receive a ball attached to a rodlike element comprising a head and a shank integrally formed from a relatively resilient plastic material; said head having a ring portion defining a first opening at one end; a web enclosing said ring portion at the other end; said web and said ring portion defining a segmental spherical-shaped cavity to receive the ball; said web being substantially thinner in section than said ring portion; said first opening being slightly smaller in cross sectional area than the cross sectional area of the ball; a second opening extending through said shank; and a slit extending inwardly from said first and second openings partially into said shank to connect said cavity and said second opening; said ring portion, said web, and said slit being resiliently deformable when the ball is projected through said first opening to allow the ball to be reecived in said cavity; said ring portion, said web, and said slit returning to their original free dimension when the ball is received in said cavity to prevent the withdrawal of the rodlike element from said socket member.

2. A socket member adapted to receive a ball attached to a rodlike element comprising a head and a shank integrally formed from a relatively resilient plastic material; said head having a ring portion defining an elliptically shaped first opening at one end; said first elliptically shaped first opening having a minor axis slightly smaller in diameter than the diameter of the ball of the rodlike element; a web enclosing said ring portion at the other end; said web being substantially thinner in section than said ring portion; said web and said ring portion defining a segmental spherical-shaped cavity adapted to receive the ball of the rodlike element; a rectangular-shaped second opening extending through said shank; and a slit extending inwardly into the portion of the shank between said first opening and said second opening to a depth less than the depth of said cavity to connect said cavity with said second opening.

3. In combination, a socket member and a rodlike element having a ball at one end; said socket member comprising a head and a shank integrally formed from a relatively resilient plastic material and disposed on one center axis; said head having a ring portion defining an elliptically shaped first opening at one end; said elliptically shaped first opening having a minor axis that is smaller than the diameter of said ball; a web enclosing said ring portion at the other end; the internal walls of said web and said ring portion defining a segmental spherical-shaped cavity adapted to receive said ball; a second opening extending through said shank; and a slit lying on said one axis and extending inwardly from said first and second openings into the portion of the shank therebetween to connect said cavity with the second opening; said web being substantially thinner in section than said ring portion; said ring portion, said slit, and said web being resiliently deformable when said ball is projected through said first opening to allow said ball to be received in said cavity; said deformed portions returning to their original free dimension when said ball is received in said cavity to retain the ball therein.

4. In combination, a socket member and a rodlike element having a ball at one end thereof; said socket member comprising a head and a shank integrally formed from a relatively resilient plastic material and disposed along one axis; said head having a ring portion with an elliptically shaped first opening at one end; said first opening having a minor axis that is smaller than the diameter of said ball; a web enclosing said ring portion at the other end; the internal walls of said web and said ring portion defining a segmental spherical-shaped cavity adapted to receive said ball; said web being substantially thinner in section than the body of said ring portion; a second opening extending through said shank; a peripheral groove at the juncture of said ring portion and said shank; and an axial slit lying on said one axis and extending inwardly from said one end of said ring portion into the portion of the shank between said cavity and said second opening up to said web at the other end to connect said cavity with said second opening; said ring portion, said web, and said slit being resiliently deformable when said ball is projected through said first opening to allow said ball to be received in said cavity; said deformed portions resiliently returning to their original free dimension when said ball is received in said cavity to prevent the withdrawal of said rodlike element from said socket member.

References Cited by the Examiner

FOREIGN PATENTS 1,146,639 5/1957 France.
222,722 10/1924 Great Britain.

CARL W. TOMLIN, *Primary Examiner.*